Aug. 6, 1935.  J. M. HOTHERSALL  2,010,023
SHEET METAL CONTAINER
Filed May 8, 1931   2 Sheets-Sheet 1
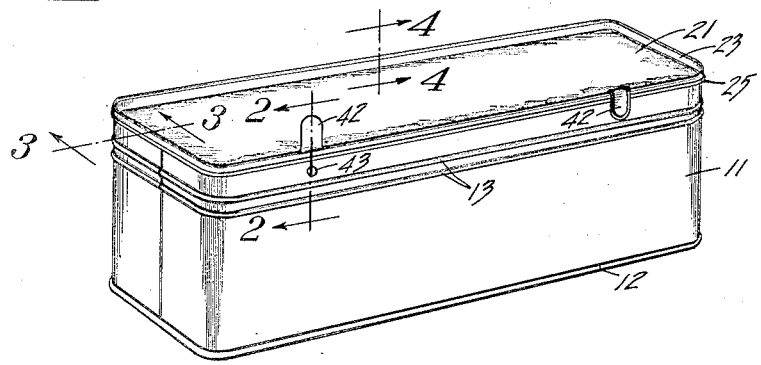
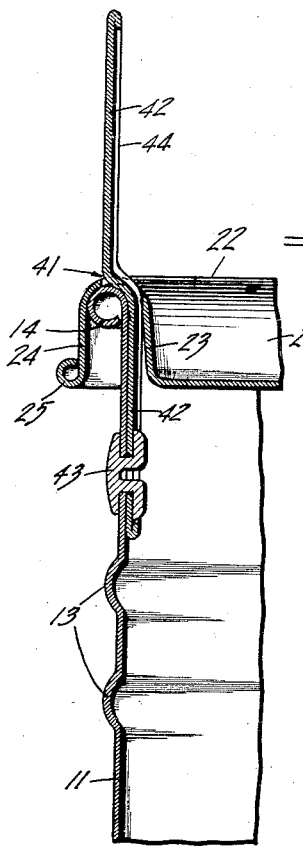
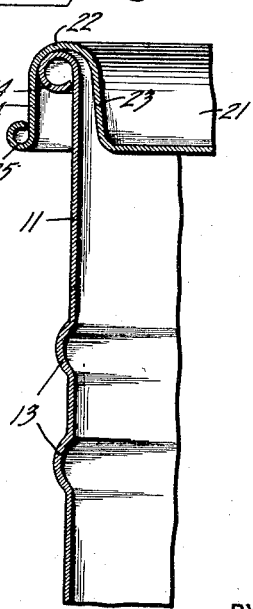
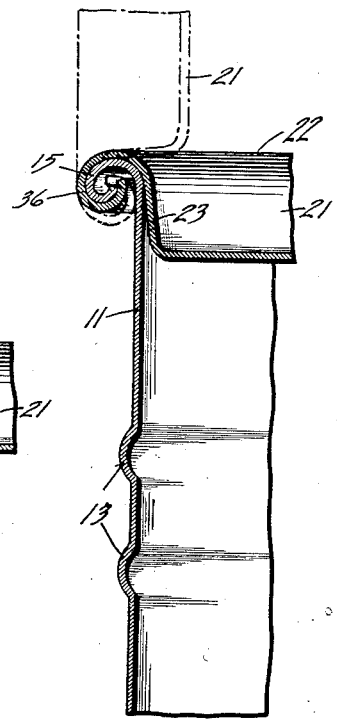
INVENTOR
John M. Hothersall
BY
John C. Carpenter
ATTORNEY

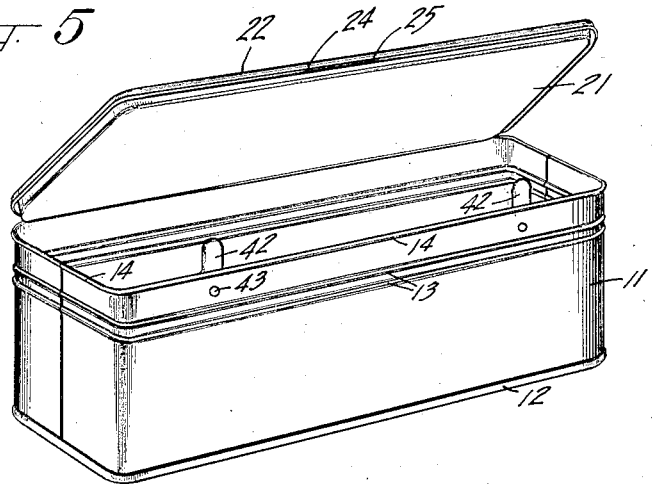
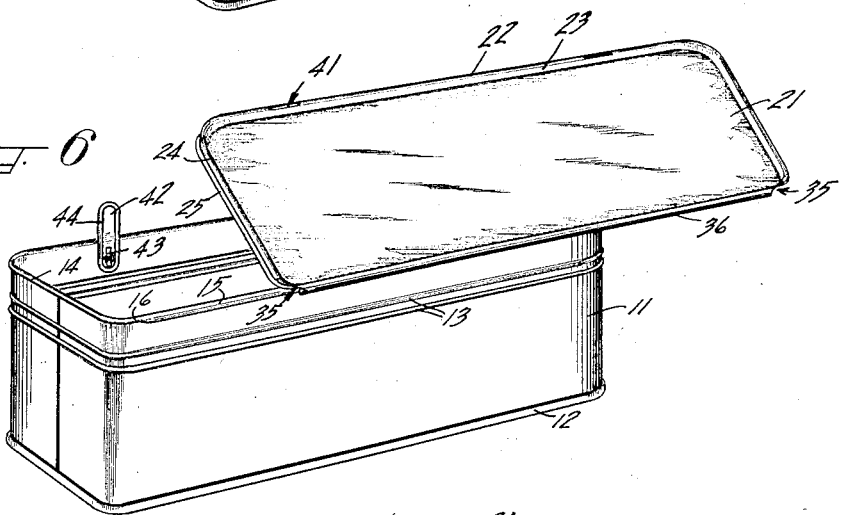
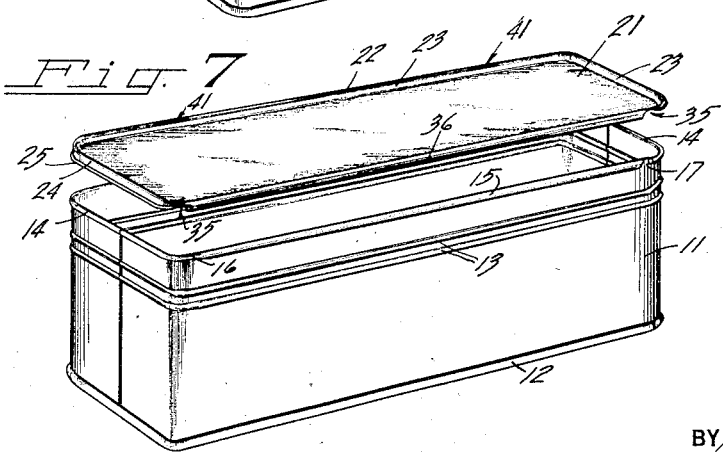

Patented Aug. 6, 1935

2,010,023

UNITED STATES PATENT OFFICE 2,010,023

SHEET METAL CONTAINER

John M. Hothersall, Brooklyn, N. Y., assignor to American Can Company, New York, N. Y., a corporation of New Jersey Application May 8, 1931, Serial No. 535,993

5 Claims. (Cl. 220—31)

The present invention relates to a sheet metal container and has particular reference to an improved simple hinge construction in such a container which permits not only hinging of the cover to the container body but also complete removal therefrom.

The principal object of the present invention is the provision of a rectangular box or container, having a detachable cover which may be easily inserted into assembled position by a sliding action of the cover relative to the container and which becomes a hinged cover after being so assembled.

An important object of the invention is the provision of a container and detachable cover of this character, one straight edge of the cover of which is formed as an open curl which will slide longitudinally of and interlock with a similar open curled straight edge formed on the corresponding container wall when the cover is put on, these curled parts of the assembled container and cover permitting hinging of the cover as one interlocked curled part oscillates with the other.

A further important object of the invention is the provision of locking clips for holding the cover in assembled and closed position on the container.

Numerous other objects and advantages of the invention will be apparent as it is better understood from the following description, which, taken in connection with the accompanying drawings discloses a preferred embodiment thereof.

Referring to the drawings:

Figure 1 is a perspective view of an improved rectangular container embodying the present invention, the cover thereof being shown in closed and partially locked position;

Figs. 2, 3 and 4 are enlarged sectional details taken substantially along the lines 2—2, 3—3 and 4—4 in Fig. 1;

Fig. 5 is a perspective view of the container with its cover in open and hinged position;

Fig. 6 is a view similar to Fig. 5 illustrating the cover partially applied to the container; and Fig. 7 is a perspective view of container and cover in separated or detached position.

One useful application for a container of the character above mentioned is found in the packing of fish fillets and similar fish products. In filling the fish into containers it is highly desirable that the mouth of the container be unobstructed so as not to interfere in any way with the packing operation. The improved container embodying the present invention and with its cover detached provides for this feature. After such a container is packed, it must be securely closed to permit subsequent icing, shipment, and other handling operations incident to its final distribution and here again the ease of assembling the cover on the container referred to and the ease and security of locking it in place, recommends it to such a use. In view of its many inherent advantages the container herein disclosed lends itself to many and varied uses.

Such a container may comprise a body 11 of rectangular form having a bottom member 12 secured thereto in any suitable manner, as by double seaming. The body 11 is preferably beaded at 13 to strengthen its walls and its upper edges along its two ends and front are curled outwardly, downwardly and inwardly into a closed edge curl 14 (Figs. 2, 3 and 5).

Along the back wall the metal of the curl is partially open to provide an open edge curl 15 which extends substantially the full width of the back or between a point where the curl is deformed as to its diameter, which may be a swelled junction point 16, where it joins with the edge curl 14 adjacent one corner of the box, and a transfer notch 17 cut across the curls 14, 15 adjacent the opposite corner.

A rectangular cover 21 is formed to correspond in shape to the container body 11, this cover having an encircling curl 22 surrounding its panel, the curl comprising spaced vertical walls 23, 24, the latter extending downwardly along two sides and the front and providing a friction wall having engagement with the curl 14 of the body 11 when assembled. The wall 24 along its three sides is further bent outwardly, upwardly and inwardly to provide an outward curled edge 25 for the cover.

On the rear of the cover 21, the curl 22 extends downwardly between transverse notches or slots 35 cut across he wall 24 and the curled edge 25, each slot being adjacent a corner of the cover. The curl 22 in this intermediate position merges into an open curl 36 which is by said notches also made open at its ends, and it extends substantially along the entire rear of the cover.

To assemble the cover 21 with the container body 11, it is only necessary to longitudinally align the open curls 15, 36 of the body and cover and to then push one curled edge into the other. This is done by first engaging the end of the open body curl 15 from the side next to the slot 17 and forcing over it the end of the cover curl 36 by sliding the cover along the container (Fig. 6). The cover at such time is held in full open position, as indicated in broken lines in Fig. 4. Such sliding engagement as just described, effects interlocking of the open curls.

In its fully assembled position but not closed (Fig. 5) the ends of the cover align with the ends of the body and the cover may then be hingedly shifted by a rotative or oscillatory movement between the open curls 15 and 36, and brought into closed position, as illustrated in full lines in Fig. 4.

The annular curl 22 of the cover 21 is slotted at 41 along its front, these slots extending through the crown of the curl 22 (Figs. 2 and 6). Locking devices cooperate with these slots and hold the cover 21 in its closed position. Such devices comprise locking clips 42 which are secured to the inside wall of the container body 11, preferably by rivets 43 passing through the container wall.

The clips 42 are preferably bent or offset at an intermediate point and partially rest upon the curled edge 14 of the body and then extend upwardly (Figs. 2 and 5). These clips may be bent back on themselves or edged at 44 for reinforcement and so that the raw outer edges of the metal may be turned under. In closing the cover 21, after the container has been filled, it is moved down on its hinged connection and brought down into the mouth of the container. During this movement the clips 42 pass into and through the slots 41 (see Fig. 2) and those parts of the clips extending above are then bent outwardly around the curl of the cover (Fig. 1) locking it in closed position with the curls of cover and body enclosed within them.

The container and cover, disclosed in the drawings, provides a simple package having no extraneous parts and one wherein complete freedom of manipulation of its cover is possible. The hinged connection between cover and container, together with the locking devices for holding the cover in closed position, provide a strong and sturdy shipping container which cannot be accidentally opened but one which may be readily opened when desired by merely unbending the clips 42.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A sheet metal container having, in combination, a body the upper edge of which is formed into a tubular curl at its front, ends and rear so that said curl extends around the top edge of the body, the curl at the rear edge of the body being open at its underside, and a cover the rear bottom edge of which is formed with a curl open at its ends and which is slid longitudinally into said open rear curl of the body to form a hinge for the cover, the ends and front of the cover having an open curl embracing the curls of the ends and front of the body when the cover is closed.

2. A sheet metal container having, in combination, a body the upper edge of which is formed into a tubular curl at its front, ends and rear, the curl at the rear edge of the body being open at its under side, and a cover the rear bottom edge of which is formed with a curl open at an end and which is slid longitudinally into said open rear curl of the body to form a hinge for the cover, the ends and front of the cover having an open curl embracing within itself the curls of the ends and the front of the body when the cover is closed, the rear curl of the body being bent inward to form a stop for the inserted cover curl.

3. A sheet metal container having, in combination, a body the upper edge of which is formed into a tubular curl at its front, ends and rear, the curl at the rear edge of the body being open at its underside, and a cover the rear bottom edge of which is formed with a curl open at its ends and which is slid longitudinally into said open rear curl of the body to form a hinge for the cover, the ends and front of the cover being provided with open curls embracing the curls of the ends and front of the body when the cover is closed, the rear curls of the body and cover being notched at an end for the assembly of the cover with the body.

4. A sheet metal container, comprising a rectangular body having a straight, tubular, open curl formed along the rear straight side edge thereof and having curls at the front and end edges thereof, and a cover formed to fit said body and having a straight, tubular, open curl formed along its rear edge, and a curl with straight depending edges formed along the front and end edges of the cover and tightly fitting around outside of the said body curls, the open curl at the rear edge of said cover being interlocked within the rear curl of the body, and having rotative movement therein to provide a hinging connection between said body and said cover.

5. A sheet metal container, comprising a rectangular body having its upper edge along the four sides of the body formed into a tubular curl, the edge along one straight side and at the juncture of a side thereof being cut across transversely and enlarged adjacent said cut to provide an open curl section, and a cover having its rear edge formed into a tubular curl the edge along one straight side thereof being cut across transversely and enlarged between said cuts to provide an open curl section being insertable into and sliding endwise within said cover open curl section and into fully assembled position, said assembled open curl sections cooperating one with the other to effect hinging between said cover and said body.

JOHN M. HOTHERSALL.